Figure 1:
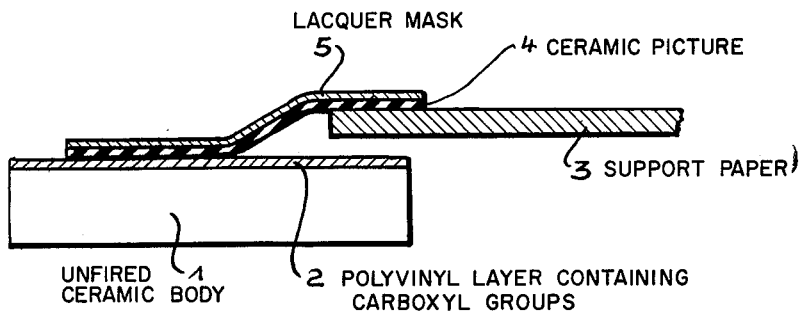

Nov. 2, 1965   J. GÖBEL   3,215,575

DECORATION OF CERAMIC WARE

Filed May 7, 1963

INVENTOR.
Johannes Göbel
BY Michael S. Striker
Attorney

United States Patent Office 3,215,575
Patented Nov. 2, 1965

3,215,575
DECORATION OF CERAMIC WARE
Johannes Göbel, Aschaffenburg (Main), Germany, assignor to Buntpapierfabrik A.G., Aschaffenburg (Main), Germany
Filed May 7, 1963, Ser. No. 278,605
Claims priority, application Germany, May 9, 1962, B 67,165
8 Claims. (Cl. 156—89)

The present invention relates to a process for decorating ceramic bodies of porcelain, earthenware or the like.

In the ceramic industry, ceramic decalcomanias are generally used for the mass decoration of porcelain and pottery, in which the ceramic colour pastes are printed with the use of suitable binders onto paper, which may be coated on the side of the paper to be printed with a special water-soluble preparation e.g. gum arabic, and in which the printed pictures are covered with a so-called lacquer mask, which serves as a support for the ceramic colour picture on slipping off the moistened picture from the support paper. Such decalcomanias are for example produced according to German patent specification 1,080,-444, in which polymers or copolymers of acrylic and methacrylic acids as well as their esters, salts and other derivatives are used as film formers for the lacquer mask.

Hitherto, such decalcomanias have been used exclusively for decorating already glazed ceramic bodies. It has, however, been found that after the firing of the ceramic pictures (over-glaze pictures) which are disposed on the glaze, the said pictures are fairly sensitive to mechanical influences and, for example, are easily scratched when cleaning the decorated articles. Moreover, the pictures are attacked by washing agents when they are washed and thereby lose their brilliance.

Accordingly, it would be of great advantage to the industry if such decalcomanias could also be applied to unglazed and unfired ceramic bodies as under-glaze pictures, could be initially baked after the said picture has been applied to the ceramic body and if the glaze could then be applied in another working step. However, it has been found that because of the high absorption capacity of the unglazed porous ceramic bodies, decalcomanias cannot be caused to adhere to the said ceramic bodies. Such decalcomanias still contain small quantities of adhesive preparation after being slipped off the support paper, which small quantities of adhesive preparation are certainly sufficient when applied to a glazed body for producing firm adhesion of the pictures to the glaze. On unglazed bodies, however, the adhesive preparation is immediately absorbed into the ceramic body so that it is not possible to produce any adhesion between the pictures and the ceramic body, although this is a prerequisite for achieving a satisfactory firing.

It has now been found that it is possible to produce adhesion of such decalcomanias to unglazed, strongly absorbent, porous, unfired ceramic bodies, if the ceramic body is insulated against its absorbent effect by coating with a film-forming and preferably also adhesive substance before the pictures are applied.

According to the present invention there is provided a process for decorating ceramic bodies of porcelain, earthenware or the like, comprising coating the ceramic body in an unglazed and unfired state with a solution or dispersion of an organic hydrophilic film-forming substance and removing the solvent or dispersion medium from the coating by evaporation, then applying a ceramic picture, using a ceramic decalcomania, to the coated ceramic body, drying the picture, and thereafter baking the picture onto the ceramic body, and providing the baked picture with a glaze. Preferably the organic hydrophilic film-forming substance chosen is one having tacky properties, so that the decalcomanias when separated from the support paper adhere well to the coating produced on the ceramic body and are firmly anchored to the ceramic body after initial drying.

In order to produce such a coating on the ceramic body for sealing off the pores of the ceramic body, polyvinyl compounds containing carboxyl groups have proved to be suitable, for example polymers or copolymers of acrylic acid, methacrylic acid and crotonic acid or their esters and salts. These covering substances may be applied in the form of aqueous dispersions or solutions to the unfired ceramic bodies, either by the latter being immersed in the dispersion or solution or by the dispersion or solution being poured or sprayed onto the ceramic bodies or brushed on by means of a brush. A thin film with a thickness of about 10 to $20\mu$ can be immediately formed, the water of the dispersion or of the solution being absorbed into the ceramic body. The decalcomania, after it has been slipped off the support paper can then be applied cold to the still moist film of polyvinyl compounds containing carboxyl groups. The picture is then allowed to dry and thereafter the body is fired or baked, the compound containing carboxyl groups already depolymerizing and vapourizing at temperatures of about 500° C. The baking treatment is generally carried out in practice at temperatures from 800 to 900° C. After the baking treatment, the body is allowed to cool and it is then covered in a known manner with the glazing composition by dipping or spraying.

However, the intermediate baking process can also be dispensed with by using decalcomanias which employ as a lacquer picture mask a hydrophilic polymeric or copolymeric film material, as described in United States patent specification No. 3,015,574 and in the corresponding British patent specification No. 837,874. According to these patent specifications, for the production of hydrophilic films which directly receive the glazing composition and therefore do not have to be baked, there are used hydrophilic polymers of acrylic acid, methacrylic acid or maleic acid or the corresponding copolymers thereof with polyvinylidene chloride, polyvinyl acetate, polyacrylic acid esters, polymethacrylic acid esters, polyvinyl acetal or styrene. If the decalcomanias are prepared with the use of films of these compounds, the glazing composition can be sprayed directly onto the decorated bodies without carrying out an intermediate baking step. The glazing composition adheres because of the hydrophilic character of these decalcomanias and does not become detached. Finally, the firing of the glaze takes place generally at temperatures of about 1400° C. The pictures produced in this way are characterized by a very high resistance against mechanical influences and washing agents, due to the fact that they are beneath the glaze.

The process of applying decalcomanias to unglazed ceramic bodies represents a considerable simplification and saving in labour by comparison with the former method of applying the decorations, which is usually effected with underglaze pictures by the method of steel engraving. For this purpose, the pictures are usually printed by the steel engraving method, using ceramic colours, onto a thin cellulose paper and then the picture is transferred from this paper to the ceramic bodies. This complicated and time-consuming method can readily be replaced by the process of this invention.

The invention is more fully explained with reference to the accompanying diagrammatic drawing and to a number of examples.

In the drawing, which shows the manner of formation of the pictures, and also the transfer thereof to the ceramic body, reference numeral—

1 represents an unfired ceramic body,
2 a polyvinyl layer containing carboxyl groups,
3 a support paper for the ceramic picture,
4 the ceramic picture, which consists of several layers of ceramic colours or fluxes, and
5 is the so-called lacquer mask, which serves as picture support when slipping the picture off the paper.

Figure 2:
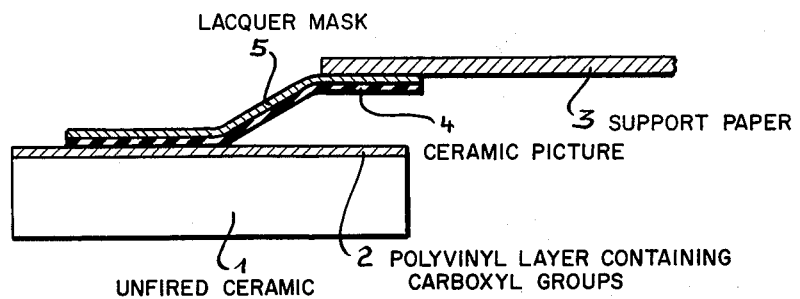

The two FIGURES 1 and 2 illustrate the instant of slipping off the picture from the support paper onto the ceramic body provided with the layer 2, and according to FIGURE 1, a ceramic decalcomania is used in which the ceramic picture 4 is arranged between the support paper 3 and the lacquer mask, while according to FIGURE 2, the picture is arranged on the lacquer mask 5 which is applied to the support paper 3.

Examples: For the following Examples 1–4, a decalcomania as shown in FIGURE 1 is employed.

Example 1

First of all, a ceramic picture 4 is produced in a manner known per se by printing the ceramic colours by screen printing or surface printing onto a so-called meta-paper 3 which is coated on the side to be printed with a rubber preparation, it being possible for the ceramic picture to consist of several colour layers which are further prepared with a flux composition in order to obtain a good bonding with the ceramic body. After drying the ceramic colours, a picture mask 5 is applied in accordance with German patent specification No. 1,080,444 to the picture which has been produced, and for this purpose a 40% solution of polymethacrylic acid ester (Plexigum P 24; manufacturer Röhm & Haas, Darmstadt) in ethyl acetate is used. The decalcomania (FIGURE 1) thus produced is immersed in water, whereupon the picture mask 5 with the adhering ceramic picture 4 can easily be slid off the support paper 3.

In order that the ceramic picture which has been slid off the support paper and is adhering to the picture mask may be united with the unglazed ceramic body 1, the latter is coated with a thin layer 2 of a solution of Vinnapas T 1041 (polyvinyl copolymer containing crotonic acid, manufactured by Wacker-Chemie; Munich), using a soft brush. For producing a solution of this product, 7.8 kg. are, for example, dissolved in a mixture of 11 kg. of ethyl alcohol, 11 liters of water and 0.5 kg. of ammonia. After the solution applied to the ceramic body has dried on, the decalcomania is laid and pressed onto the body, and any air bubbles which have formed are carefully removed. The picture is now allowed to dry onto the ceramic body and the latter is baked at a temperature of 900° C. The body is then glazed in the usual manner by being dipped into a glazing mass of usual composition. After drying the glazing mass, the burning of the glaze is carried out at 1400° C. in a muffle furnace.

Example 2

A ceramic picture is produced, meta-paper again being used as support. First of all a so-called fluxing layer is applied, consisting of a low-melting silicate mixture. This layer is applied in powder form to an initially printed varnish layer. After drying this layer, the ceramic picture is printed as in Example 1 and thereafter provided with a lacquer mask.

In this case, the unfired ceramic body is treated with a methacrylic acid ester dispersion which contains carboxyl groups (Flextol B 7V; manufacturer Röhm & Haas, Darmstadt), whereupon the ceramic decalcomania separated from the support paper is laid on the coating thus produced and is pressed firmly onto the latter. Any air bubbles are to be removed. The picture is now baked, and the glazing of the body and also the burning of the glaze is carried out as indicated in Example 1.

Example 3

In this case, the ceramic picture is produced as in Example 2. The unfired ceramic bodies are coated with a solution of polyvinyl acetate copolymer containing crotonic acid. (Mowilith Ct5A; manufacturer Farbwerke Hoechst, Frankfurt/Main.) A 50% ammoniacal solution in alcohol is used. The further processing, i.e. the decoration of the body, the baking, the application of the glaze and the glaze firing are carried out as described in Example 1.

Example 4

The ceramic picture is produced as described in Example 1. In this case, the ceramic body is coated by spraying on a polymethacrylic dispersion containing carboxyl groups (Plextol BV 560n; a non-ionic dispersion of Röhm & Haas, Darmstadt). The decoration of the body, the baking, the glazing and the glaze firing are carried out as described in Example 1.

Example 5

According to this example, a decalcomania is used such as shown in FIGURE 2 and in which the sequence in the formation of the layers is modified somewhat as compared with the embodiment according to FIGURE 1.

In the present case, first of all a lacquer mask 5 is applied to the meta-paper 3 using a lacquer consisting of polymethacrylic acid ester (Plexigum P 24) and, after drying, the ceramic picture 4 is printed in several colours on the mask by screen printing, the ceramic colours being prepared with a flux composition as in Example 1. This picture is then applied to the ceramic body 1 which has been coated beforehand with a layer 2 of a polymethacrylic acid ester containing carboxyl groups and in dispersion form (Plextol PV 500n; Röhm & Haas, Darmstadt) and dried, so that the picture layer 4 is disposed on the layer 2 containing carboxyl groups. The support picture is then moistened and stripped off and the ceramic picture dries onto the body. The baking of the picture, the glazing of the body and the glaze firing at 1400° C. then are carried out as described in Example 1.

Example 6

The ceramic picture, in one or more colours, is first of all applied by means of a screen to a support or carrier paper (meta-paper) with a gum arabic layer, the known printing oils serving as binders. However, the picture can also be applied as a powder to a first impression of lacquer. After drying, the ceramic picture is coated with a lacquer mask of a hydrophilic film material, which is applied in dissolved form by screen printing or by means of a doctor. The solution has the following composition:

18 kg. of a copolymer of 35% methacrylic acid and 65% methyl methacrylate
61.5 kg. ethyl glycol
20.5 kg. of tetralin
35.7 kg. of polyvinyl methyl ether, K-value=40 in the form of a 70% toluene solution.

The ceramic picture produced in this way is slid off the support paper after having been moistened with water, the picture adhering to the lacquer mask.

For uniting the ceramic picture, slid off the support paper and adhering to the picture mask, with the unglazed ceramic unfinished body 1, the latter is coated by means of a soft brush with a thick layer 2 of a solution of Vinnapas T 1041 (polyvinyl copolymer containing crotonic acid and manufactured by Wacker-Chemie, Munich). In order to prepare a solution of this product, 7.8 kg. are, for example, dissolved in a mixture of 11 kg. of ethyl alcohol, 11 liters of water and 0.5 kg. of ammonia. After the intial drying of the solution applied to the body, the decalcomania is now laid on the body and pressure is applied. Any air bubbles which form are carefully removed. The picture is now allowed to dry onto the body.

The glazing composition is now sprayed on and the body, after the composition has dried, is fired in a muffle furnace at a temperature of about 1400° C. A separate intermediate baking of the organic substance of the various film materials before applying the glaze composition is dispensed with, since the film mask of the applied picture has hydrophilic properties, in the same way as the crotonic acid-containing polyvinyl copolymer Vinnapas T 1041, applied for fixing the ceramic picture on the body.

What I claim and desire to secure by Letters Patent is:

1. A process for decorating ceramic bodies of porcelain, earthenware and the like, comprising coating the ceramic body in its unglazed and unfired and thus absorbent and porous condition with a liquid containing an organic hydrophilic film-forming substance and removing the liquid from the coating by evaporation, thereafter applying a ceramic picture by means of a ceramic decalcomania to the coated ceramic body, drying the picture, and thereafter baking the picture onto the ceramic body and finally providing the baked picture with a glaze.

2. A process according to claim 1, wherein the coating liquid comprises the organic hydrophilic film-forming substance dissolved in a solvent therefor.

3. A process according to claim 1, wherein the organic hydrophilic film-forming substance possesses tacky properties.

4. A process according to claim 1, wherein the organic hydrophilic film-forming substance is a polyvinyl compound containing carboxyl groups.

5. A process according to claim 1, wherein the ceramic decalcomania used is provided with a lacquer picture mask of a hydrophilic polymer.

6. A process for decorating ceramic bodies of porcelain, earthenware and the like, comprising coating the ceramic body in its unglazed and unfired and thus absorbent and porous condition with a liquid containing an organic hydrophilic film-forming substance chosen from the group consisting of polymers and copolymers of acrylic acid, methacrylic acid and crotonic acid, their esters and salts, and removing the liquid from the coating by evaporation, thereafter applying a ceramic picture by means of a ceramic decalcomania to the coated ceramic body, drying the picture, and thereafter baking the picture onto the ceramic body and finally providing the baked picture with a glaze.

7. A process for decorating ceramic bodies of porcelain, earthenware and the like, comprising coating the ceramic body in its unglazed and unfired and thus absorbent and porous condition with a liquid containing an organic hydrophilic film-forming substance and removing the liquid from the coating by evaporation, thereafter applying a ceramic picture by means of a ceramic decalcomania to the coated ceramic body, the ceramic decalcomania used being provided with a lacquer picture mask of a hydrophilic material chosen from the group consisting of polymers of acrylic acid, methacrylic acid and maleic acid and corresponding copolymers thereof with polyvinylidene chloride, polyvinyl acetate, polyacrylic acid ester, polymethacrylic ester, polyvinyl acetate and styrene, drying the picture, and thereafter baking the picture onto the ceramic body and finally providing the baked picture with a glaze.

8. A process for decorating ceramic bodies of porcelain, earthenware and the like, comprising the steps of coating the ceramic body in its unglazed and unfired condition with a liquid containing an organic hydrophilic film-forming substance; evaporating the liquid from the thus formed coating; applying a ceramic picture by means of a ceramic decalcomania to the thus formed dry coating on said ceramic body, said ceramic decalcomania being provided with a lacquer picture mask of a hydrophilic material chosen from the group consisting of polymers of acrylic acid, methacrylic acid and maleic acid and corresponding copolymers thereof with polyvinylidene chloride, polyvinyl acetate, polyacrylic acid ester, polymethacrylic ester, polyvinyl acetate and styrene; drying said picture; applying to the thus decorated unfired ceramic body an unmatured glaze composition; and submitting the thus formed object to a firing process.

References Cited by the Examiner
UNITED STATES PATENTS

| | | | |
|---|---|---|---|
| 2,700,008 | 1/55 | Compton et al. | 156—89 |
| 3,015,574 | 1/62 | Gobel | 1173.6 |

EARL M. BERGERT, *Primary Examiner.*